United States Patent

Uota et al.

[11] Patent Number: 5,149,731
[45] Date of Patent: Sep. 22, 1992

[54] POLYARYLENE SULFIDE RESIN COMPOSITION

[75] Inventors: Katsumi Uota; Hiroyuki Sano; Hajime Serizawa; Masaru Kubota, all of Shizuoka, Japan

[73] Assignee: Polyplastics Co., Ltd., Osaka, Japan

[21] Appl. No.: 682,250

[22] Filed: Apr. 9, 1991

[30] Foreign Application Priority Data

Apr. 25, 1990 [JP] Japan .................... 2-110893

[51] Int. Cl.⁵ .................... C08J 5/10; C08K 5/24; C08L 81/04
[52] U.S. Cl. .................... 524/265; 524/114; 524/188; 524/264; 524/494; 524/538; 523/213; 525/66; 525/106; 525/184; 525/189; 525/426; 525/430; 525/431; 525/537; 525/540
[58] Field of Search .............. 524/188, 114, 264, 265, 524/494, 538; 523/213; 525/66, 106, 184, 189, 426, 430, 431, 537, 540

[56] References Cited

U.S. PATENT DOCUMENTS 4,528,346  7/1985  Sugie et al. .................... 525/523
4,748,169  5/1988  Izutsu et al. .................... 524/504
4,917,957  4/1990  Nitoh et al. .................... 524/262

FOREIGN PATENT DOCUMENTS 59-207921  11/1984  Japan .

Primary Examiner—Paul R. Michl
Assistant Examiner—U. K. Rajguru
Attorney, Agent, or Firm—Depaoli & O'Brien

[57] ABSTRACT

The polyarylene sulfide resin composition is improved in impact strength and rigidity and useful as engineering plastics. It is prepred by mixing 100 parts by weight of a resin component comprising (A) 99 to 20 parts by weight of a polyarylene sulfide resin and
(B) 1 to 80 parts by weight of a polyamide resin with
(C) 0.5 to 50 parts by weight of an olefin copolymer comprising an α-olefin and a glycidyl ester of an α, β-unsaturated acid,
(D) 0.01 to 5 parts by weight of an alkoxysilane compound and
(E) 0 to 400 parts by weight of one or more fillers selected from among fibrous, powdery and flaky ones.

15 Claims, No Drawings

POLYARYLENE SULFIDE RESIN COMPOSITION

BACKGROUND OF THE INVENTION

The present invention relates to a polyarylene sulfide resin composition. More particularly, the present invention relates to a polyarylene sulfide resin composition which has improved impact resistance and toughness and is useful in a wide range of applications as an engineering plastic.

Recently thermoplastic resins which have high heat and chemical resistance and excellent flame retardance have been demanded as the materials for components of electrical or electronic appliances, automobile devices or chemical instruments. Polyarylene sulfide resin represented by polyphenylene sulfide is one of the resins satisfying this demand inasmuch as the resin is inexpensive relative to its excellent properties. The demand for the resin has thus increased.

However, polyarylene sulfide resin has a fundamental disadvantage in that it has poor toughness, is brittle, and has insufficient mechanical properties represented by impact resistance.

For the purpose of solving this problem, for example, (1) a method of adding a reinforcement such as glass fiber or carbon fiber and (2) a method of adding other polymers have been employed.

However, these methods have not been satisfactory owing to their inherent problems.

Namely, method (1) provided a resin composition which is inferior to other engineering plastics such as polyacetal, PBT, polysulfone or polyether sulfone with respect to elongation and toughness and therefore is usable only in a limited field, although the composition has remarkably improved strengths, stiffness, heat resistance and dimensional stability to be useful as an engineering plastic. Although many proposals have been made with respect to method (2), the compositions obtained according to the proposals generally exhibit a lowered thermal deformation temperature and the present inventors have found that few of the proposals are sufficiently effective. Among the proposals, the addition of an olefin copolymer comprising an α-olefin and a glycidyl ester of an α,β-unsaturated acid described in Japanese Patent Laid-Open Nos. 154757/1983, 152953/1984, 189166/1984 and 198664/1989 is recognizably effective in overcoming the above disadvantages. However, the compositions thus improved are yet insufficient for some uses requiring toughness and impact resistance and therefore are required to be further improved in many cases.

Further, Japanese Patent Laid-Open No. 155462/1984 discloses a process of adding a polyamide resin and an epoxy resin to a polyarylene sulfide resin. However, this process is also insufficient, because the obtained molded article causes bleed-through and has a poor surface condition and the composition exhibits remarkably low stability in a molten fluid state.

SUMMARY OF THE INVENTION

The inventors of the present invention have found that the impact resistance and toughness of a polyarylene sulfide resin can be remarkably improved by simultaneously adding an olefin copolymer comprising an α-olefin and a glycidyl ester of an α,β-unsaturated acid and a polyamide resin to a polyarylene sulfide resin and melt-kneading the obtained mixture together with a silane compound having an alkoxy group in its molecule.

Namely, the present invention relates to a polyarylene sulfide resin composition prepared by mixing 100 parts by weight of a resin component comprising (A) 99 to 20 parts by weight of a polyarylene sulfide resin and (B) 1 to 80 parts by weight of a polyamide resin with (C) 0.5 to 50 parts by weight of an olefin copolymer comprising an α-olefin and a glycidyl ester of an α,β-unsaturated acid, (D) 0.01 to 5 parts by weight of an alkoxysilane compound and (E) 0 to 400 parts by weight of one or more fillers selected from among fibrous, powdery and flaky ones.

DETAILED DESCRIPTION OF THE INVENTION

The polyarylene sulfide resin to be used in the present invention as component (A) is mainly constituted of repeating units represented by the formula: $+Ar-S+$ (wherein Ar is an arylene group).

Examples of the arylene group include p-phenylene, m-phenylene, o-phenylene and substituted phenylene groups (wherein the substituent is an alkyl group preferably having 1 to 5 carbon atoms or a phenyl group), p,p'-diphenylene sulfone, p,p'-biphenylene, p,p'-diphenylene ether, p,p'-diphenylenecarbonyl and naphthalene groups.

Although an arylene sulfide homopolymer constituted of the same repeating units among the arylene sulfide groups described above may be used in the present invention, the use of a copolymer constituted of a plurality of repeating units different from each other is preferable in some cases with respect to the processability of the resulting composition.

In particular, a substantially linear homopolymer composed of p-phenylene sulfide repeating units is preferably used.

The copolymer to be used in the present invention may be any one constituted of two or more repeating units selected from among the arylene sulfide units mentioned above. In particular, a copolymer comprising p-phenylene sulfide units and m-phenylene sulfide units is preferably used. More particularly, it is suitable with respect to heat resistance, moldability, mechanical characteristics and so on to use a substantially linear copolymer comprising at least 60 molar %, still preferably at least 70 molar % of p-phenylene sulfide units. Further, it is preferable that the copolymer contain 5 to 40 molar %, still preferably 10 to 25 molar % of m-phenylene sulfide units.

Among such copolymers, a block copolymer (for example, one disclosed in Japanese Patent Laid-Open No. 14228/1986) is preferably used rather than a random one.

The polyarylene sulfide resin to be used in the present invention as component (A) may be a polymer having improved molding processability by crosslinking a relatively low-molecular polymer oxidatively or thermally to increase its melt viscosity, or a substantially linear polymer prepared by the polycondensation of a monomer component mainly comprising a difunctional monomer. In many cases, the latter polymer is superior to the former with respect to the physical properties of the resulting molded article.

According to the present invention, a resin composition prepared by blending a crosslinked polyarylene sulfide resin prepared from a monomer having at least three functional groups as a part of the monomer component with the linear polymer described above may be used.

The polyamide resins to be used as component (B) in the present invention are numerous. Examples thereof include polyamide resins prepared by the polycondensation between a dicarboxylic acid such as oxalic, adipic, suberic, sebacic, terephthalic, isophthalic or 1,4-cyclohexanedicarboxylic acid and a diamine such as ethylenediamine, pentamethylenediamine, hexamethylenediamine, decamethylenediamine, 1,4-cyclohexanediamine or m-xylylenediamine; those prepared by the polymerization of a cyclic lactam such as caprolactam or laurolactam; and those prepared by the copolymerization of a cyclic lactam with a salt of a dicarboxylic acid with a diamine. Among these polyamide resins, nylons 6, 66, 6.10, 66/6 10, 6/66 and 12 are preferable, nylons 6 and 66 being more preferable.

A polyamide elastomer resin may be used as the component (B) as well as above polyamide resin.

The polyamide elastomer resins is a block copolymer comprising a hard polyamide segment and a soft segment bonded thereto and having a flexural modulus of 10,000 kgf/cm$^2$ or below (at a relative humidity of 50% and 23° C.). The polyamide component constituting the hard segment includes polyamides 6, 66, 612, 11 and 12, while the component constituting the soft segment includes polyoxyethylene glycol, polyoxypropylene glycol and polyoxytetramethylene glycol.

According to the present invention, two or more members selected from the group consisting of the polyamide resins and polyamide elastomer resins mentioned above may be used as the component (B). In particularly, a mixture of a polyamide resin with a polyamide elastomer resin is preferable.

It is preferable that the polyamide resin to be used in the present invention have a water content not exceeding a specific value, so that the resin be dried prior to the use thereof.

According to the present invention, the proportion of the polyamide resin (B) is 1 to 80% by weight based on the total amount of the resins (A) and (B). When the proportion of the component (B) is too low, the toughness will be hardly improved, while when it is too high, the advantages inherent in the polyarylene sulfide resin will be adversely affected.

Component (C) according to the present invention is an olefin copolymer comprising an α-olefin and a glycidyl ester of an α,β-unsaturated acid. The α-olefin includes ethylene, propylene and butene-1, among which ethylene is preferable. The glycidyl ester of an α,β-unsaturated acid includes glycidyl acrylate, glycidyl methacrylate and glycidyl ethacrylate, among which glycidyl methacrylate is preferable.

It is suitable that the content of the glycidyl ester in the copolymer be 1 to 50 molar %. In addition, a terpolymer further comprising another unsaturated monomer may be used and examples of the unsaturated monomer to be copolymerized as a third monomer include vinyl ether, vinyl acetate, vinyl propionate, methyl acrylate, methyl methacrylate, acrylonitrile and styrene.

When a graft copolymer which will be described below is used as component (C), more remarkable effects can be attained. The graft copolymer is one comprising (a) an olefin copolymer comprising an α-olefin and a glycidyl ester of an α,β-unsaturated acid and (b) one or more members selected from among vinyl polymers and copolymers each constituted of repeating units represented by the following general formula (1) which are chemically bonded to the copolymer (a) to form a branched or crosslinked structure:

wherein R represents a hydrogen atom or a lower alkyl group; X represents one or more groups selected from among —COOCH$_3$, —COOC$_2$H$_5$, —COOC$_4$H$_9$, —COOCH$_2$CH(C$_2$H$_5$)C$_4$H$_9$, —CN and

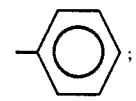

and n is an integer of 1 or above.

The α-olefin constituting the copolymer (a) includes ethylene, propylene and butene-1, among which ethylene is preferable. The glycidyl ester of an α,β-unsaturated acid which is the other monomer constituting the copolymer (a) includes glycidyl acrylate, glycidyl methacrylate and glycidyl ethacrylate, among which glycidyl methacrylate is preferable. The copolymer (a) can be prepared by copolymerizing an α-olefin (such as ethylene) with a glycidyl ester of an α,β-unsaturated acid according to a conventional radical polymerization process.

It is preferable that the segment (a) comprise 50 to 99 molar % of an α-olefin and 50 to 1 molar % of a glycidyl ester of an unsaturated acid.

The polymer or copolymer (b) to be grafted onto the copolymer (a) to form a branched or crosslinked chain is a homopolymer constituted of the same repeating units represented by the above general formula (1) or a copolymer constituted of two or more kinds of repeating units represented thereby. Examples of the (co)-polymer (b) include polymethyl methacrylate, polyethyl acrylate, polybutyl acrylate, poly-2-ethylhexyl acrylate, polystyrene, polyacrylonitrile, acrylonitrile-styrene copolymer, polybutyl acrylate-polymethyl methacrylate copolymer and polybutyl acrylate-polystyrene copolymer.

Although the process for the preparation of a graft copolymer comprising the segments (a) and (b) is not particularly limited, the graft copolymer can be easily prepared by radical reaction. For example, the graft copolymer can be prepared by treating the polymer (a) with a peroxide or the like to form a free radical and melt-kneading the resulting polymer (a) together with a polymer represented by the general formula (1) or the monomer constituting the polymer. The constitutional ratio of the segment (a) to the segment (b) is suitably between 95:5 and 40:60.

The amount of the component (C) to be used is 0.5 to 50 parts by weight, preferably 1 to 20 parts by weight, per 100 parts by weight of the total amount of the components (A) and (B).

When the amount of component (C) is too small, the resulting composition will not have sufficiently improved toughness and impact resistance, while when the amount is too large, the thermal deformation temperature will be low and mechanical properties such as stiffness will be unfavorably affected.

Further, the composition of the present invention contains an alkoxysilane compound (D).

The alkoxysilane compound to be used as component (D) in the present invention is one or more members selected from among vinylalkoxysilane, epoxyalkoxysilane, aminoalkoxysilane and mercaptoalkoxysilane.

Examples of the vinylalkoxysilane include vinyltriethoxysilane, vinyltrimethoxysilane and vinyltris($\beta$-methoxyethoxy)silane.

Examples of the epoxyalkoxysilane include $\gamma$-glycidoxypropyltrimethoxysilane, $\beta$-(3,4-epoxycyclohexyl)ethyltrimethoxysilane and $\gamma$-glycidoxypropyltriethoxysilane.

Examples of the aminoalkoxysilane include $\gamma$-aminopropyltrimethoxysilane, $\gamma$-aminopropyltriethoxysilane, $\gamma$-aminopropylmethyldimethoxysilane, $\gamma$-aminopropylmethyldiethoxysilane, N-($\beta$-aminoethyl)-$\gamma$-aminopropyltrimethoxysilane, N-phenyl-$\gamma$-aminopropyltrimethoxysilane, $\gamma$-diallylaminopropyltrimethoxysilane and $\gamma$-diallylaminopropyltrimethoxysilane.

Examples of the mercaptoalkoxysilane include $\gamma$-mercaptopropyltrimethoxysilane and $\gamma$-mercaptopropyltriethoxysilane.

The amount of the alkoxysilane compound to be used as component (D) is 0.01 to 5 parts by weight, preferably 0.1 to 3 parts by weight, per 100 parts by weight of the total amount of the polyarylene sulfide resin (A) and the polyamide resin (B).

When the amount of the alkoxysilane compound is too small, the resulting composition will be hardly improved in toughness, while when it is too large, the resulting composition will be so viscous as to cause problems during molding, although the optimum amount varies depending upon the kind of the alkoxysilane used and the use of the resultant composition.

Although the filler (E) is not necessarily an essential component in the present invention, the addition thereof is preferable for producing a molded article which has excellent mechanical strengths, stiffness, heat resistance, dimensional stability, electrical properties and other properties. The filler (E) may be selected from among fibrous, powdery and flaky ones depending upon the object.

The fibrous filler includes inorganic fibrous materials, for example, glass fiber, asbestos fiber, carbon fiber, silica fiber, silica/alumina fiber, zirconia fiber, boron nitride fiber, silicon nitride fiber, boron fiber, potassium titanate fiber and fibers of metals such as stainless steel, aluminum, titanium, copper or brass. Among them, glass fiber and carbon fiber are most representative. Further, the fibrous filler includes high-melting organic fibrous materials and particular examples thereof include polyamides, fluororesins and acrylic resins.

The powdery filler includes carbon black, silica, quartz powder, glass bead, glass powder, silicates such as calcium silicate, aluminum silicate, kaolin, talc, clay, diatomaceous earth and wollastonite, metal oxides such as iron oxide, titanium oxide and alumina; metal carbonates such as calcium carbonate and magnesium carbonate; metal sulfates such as calcium sulfate and barium sulfate; silicon carbide, silicon nitride, boron nitride and various metal powders.

The flaky filler includes mica, glass flake and various metal foils.

These inorganic fillers may be used alone or as a mixture of two or more. The simultaneous use of a fibrous filler, particularly glass or carbon fiber with a powdery or flaky filler is particularly effective in producing an article which not only has excellent mechanical strengths but also has excellent dimensional accuracy and electrical properties.

The composition of the present invention can be prepared by various known processes. Although the composition is generally prepared by mixing all the components together and melt-kneading and pelletizing the obtained mixture with an extruder, a part of the components may be preliminarily extruded, followed by the addition of the other components thereof. In particular, it is preferable that component (D) be kneaded in the presence of components (A) and (B) and, if necessary, component (C) in a molten state for at least 30 seconds. Specifically, components (A), (B) and (C) and, if necessary, component (D) and other components are preliminarily mixed together with a mixing machine such as a tumbler or a Henschel mixer and melt-kneaded with a single- or twin-screw extruder to give pellets. In this preparation, it is preferable to employ a process which comprises pulverizing a part or the whole of component (A) or (B), mixing the obtained powder with component (D) with a blender, mixing the obtained mixture with the residual components and melt-kneading the obtained mixture. Further, it is preferable to add component (E) during or after the melt-kneading.

The melt-kneading is conducted at a temperature higher than the melting point of the resin component by 5° to 100° C., preferably 10° to 60° C. Melt-kneading at too high a temperature unfavorably causes decomposition and abnormal reaction.

The melt-kneading time is 30 seconds to 15 minutes, preferably 1 to 10 minutes.

The excellent characteristics of a molded article formed of the composition according to the present invention are inferred to be resulting from the improved dispersibility of components (B) and (C) in component (A) and the excellent phase structure brought about thereby. This inference is supported by the results of electron microscopy of a section of a molded article made from the composition of the present invention.

The composition of the present invention may further contain conventional additives and examples thereof include antioxidant, heat stabilizer, lubricant, nucleating agent, ultraviolet absorber, coloring agent, mold release agent and other thermoplastic resins, so far as the use thereof does not deviate from the object of the present invention.

These additives may be added either during the melt kneading described above or in some other step.

The polyarylene sulfide resin composition of the present invention provides a molded article which has remarkably improved mechanical properties such as tensile elongation and impact resistance and has excellent heat resistance and other properties, thus being useful in a wide range of applications as an engineering plastic.

The present invention will now be described in more detail by referring to the following Examples, though it is not limited by them.

EXAMPLES 1 TO 18 AND COMPARATIVE EXAMPLES 1 to 9

As specified in the following Tables, a polyphenylene sulfide resin (a product of Kureha Chemical Industry Co., Ltd., trade name "Fortlon KPS") as component (A) was mixed with nylon 66 or a polyamide elastomer as component (B) and the compounds listed in these Tables as components (C) and (D) in a Henschel mixer for 5 minutes. The obtained mixture was extruded at a cylinder temperature of 310° C. to give pellets of a polyphenylene sulfide resin composition. These pellets were molded into an ASTM test piece with an injection molding machine at a cylinder temperature of 320° C. and a mold temperature of 150° C. This test piece was examined for physical properties (see Tables 1 and 2).

Further a composition containing glass fiber as component (E) in addition to the above components was examined in a similar manner to that described above (see Table 4).

Furthermore, a composition prepared by adding only component (B) to component (A), one prepared by adding only component (C) to component (A), and one comprising components (A), (B) and (C) were each molded into a test piece and examined in a similar manner to that described above (see Tables 3 and 4).

The items and methods of the evaluation are as follows:

Izod impact strength:

Notched and unnotched Izod impact strengths were determined according to ASTM D-256.

Tensile test:

Tensile strength and tensile elongation were determined according to ASTM D-638.

TABLE 1

|  |  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| A | polyphenylene sulfide resin (pts. by wt.) | 60 | 60 | 60 | 80 | 60 | 60 | 60 | 60 | 60 |
| B | nylon 66 (pts. by wt.) | 40 | 40 | 40 | 20 | 40 | 30 | 40 | 40 | 40 |
|   | polyamide elastomer* (pts. by wt.) |  |  |  |  |  | 10 |  |  |  |
| C | E/GMA (ethylene/glycidyl methacrylate (85/15) copolymer) (pts. by wt.) | 10 | 5 |  |  |  |  |  |  |  |
|   | E/GMA-polymethyl methacrylate (70-30) graft copolymer (pts. by wt.) |  |  | 10 | 10 | 5 | 10 |  | 10 | 10 |
|   | E/GMA-polyacrylonitrile/styrene (70-30) graft copolymer (pts. by wt.) |  |  |  |  |  |  | 10 |  |  |
| D | γ-glycidoxypropyltrimethoxysilane (pts. by wt.) |  |  |  |  |  |  |  | 2 |  |
|   | γ-aminopropyltriethoxysilane (pts. by wt.) | 2 | 2 | 2 | 2 | 2 | 2 | 2 |  |  |
|   | γ-mercaptopropyltrimethoxysilane (pts. by wt.) |  |  |  |  |  |  |  |  | 2 |
| E | glass fiber (pts. by wt.) |  |  |  |  |  |  |  |  |  |
| Izod impact strength | notched [kg cm/cm] | 5.8 | 5.0 | 6.9 | 5.8 | 5.7 | 8.1 | 7.2 | 6.5 | 6.4 |
|  | unnotched [kg cm/cm] | 119 | 85 | 142 | 92 | 123 | 164 | 176 | 118 | 115 |
| Tensile elongation [%] |  | 52 | 43 | 68 | 34 | 56 | 65 | 72 | 60 | 58 |
| Tensile strength [kg f/cm²] |  | 610 | 600 | 605 | 650 | 600 | 590 | 610 | 615 | 610 |

*polyamide elastomer comprising nylon 12 as a hard segment and polyoxybutylene as a soft segment and having a flexural modulus of 900

TABLE 2

|  |  | Ex. 10 | Ex. 11 | Ex. 12 | Ex. 13 | Ex. 14 |
|---|---|---|---|---|---|---|
| A | polyphenylene sulfide resin (pts. by wt.) | 60 | 60 | 60 | 80 | 60 |
| B | nylon 66 (pts. by wt.) | 40 | 40 | 40 | 40 | 40 |
|   | polyamide elastomer* (pts. by wt.) |  |  |  |  |  |
| C | E/GMA (ethylene/glycidyl methacrylate (85/15) copolymer) (pts. by wt.) |  |  |  |  |  |
|   | E/GMA-polymethyl methacrylate (70-30) graft copolymer (pts. by wt.) | 10 | 10 | 10 |  |  |
|   | E/GMA-polyacrylonitrile/styrene (70-30) graft copolymer (pts. by wt.) |  |  |  | 10 | 10 |
| D | γ-glycidoxypropyltrimethoxysilane (pts. by wt.) |  |  |  |  |  |
|   | γ-aminopropyltriethoxysilane (pts. by wt.) | 1.0 | 0.5 | 0.1 | 1.0 | 0.5 |
|   | γ-mercaptopropyltrimethoxysilane (pts. by wt.) |  |  |  |  |  |
| E | glass fiber (pts. by wt.) |  |  |  |  |  |
| Izod impact strength | notched [kg cm/cm] | 6.0 | 5.5 | 5.1 | 6.1 | 5.5 |
|  | unnotched [kg cm/cm] | 92 | 68 | 53 | 105 | 76 |
| Tensile elongation [%] |  | 44 | 32 | 15 | 43 | 24 |
| Tensile strength [kg f/cm²] |  | 605 | 600 | 600 | 605 | 595 |

*polyamide elastomer comprising nylon 12 as a hard segment and polyoxybutylene as a soft segment and having a flexural modulus of 900

TABLE 3

|   |   | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| A | polyphenylene sulfide resin (pts. by wt.) | 60 | 100 | 100 | 60 | 60 | 60 |
| B | nylon 66 (pts. by wt.) | 40 | | | 40 | 40 | 40 |
|   | polyamide elastomer* (pts. by wt.) | | | | | | |
| C | E/GMA (ethylene/glycidyl methacrylate (85/15) copolymer) (pts. by wt.) | | 10 | | 10 | | |
|   | E/GMA-polymethyl methacrylate (70–30) graft copolymer (pts. by wt.) | | | 10 | | 10 | |
|   | E/GMA-polyacrylonitrile/styrene (70–30) graft copolymer (pts. by wt.) | | | | | | 10 |
| D | γ-glycidoxypropyltrimethoxy-silane (pts. by wt.) | | | | | | |
|   | γ-aminopropyltriethoxy-silane (pts. by wt.) | | | | | | |
|   | γ-mercaptopropyltrimethoxy-silane (pts. by wt.) | | | | | | |
| E | glass fiber (pts. by wt.) | | | | | | |
| Izod impact strength | notched [kg cm/cm] | 2.4 | 3.7 | 4.1 | 4.3 | 4.7 | 4.8 |
|   | unnotched [kg cm/cm] | 15.1 | 16.8 | 19.3 | 31.6 | 39.3 | 46.7 |
| Tensile elongation [%] | | 5.8 | 6.0 | 8.4 | 9.9 | 10.5 | 13.2 |
| Tensile strength [kg f/cm²] | | 660 | 710 | 705 | 600 | 595 | 590 |

*polyamide elastomer comprising nylon 12 as a hard segment and polyoxybutylene as a soft segment and having a flexural modulus of 900

TABLE 4

|   |   | Comp. Ex. 7 | Comp. Ex. 8 | Comp. Ex. 9 | Ex. 15 | Ex. 16 | Ex. 17 | Ex. 18 |
|---|---|---|---|---|---|---|---|---|
| A | polyphenylene sulfide resin (pts. by wt.) | 100 | 60 | 60 | 60 | 60 | 60 | 60 |
| B | nylon 66 (pts. by wt.) | | 40 | 40 | 40 | 40 | 40 | 40 |
|   | polyamide elastomer* (pts. by wt.) | | | | | | | |
| C | E/GMA (ethylene/glycidyl methacrylate (85/15) copolymer) (pts. by wt.) | | | | | | | |
|   | E/GMA-polymethyl methacrylate (70–30) graft copolymer (pts. by wt.) | 10 | | 10 | 10 | | | |
|   | E/GMA-polyacrylonitrile/styrene (70–30) graft copolymer (pts. by wt.) | | | | | 10 | 10 | 10 |
| D | γ-glycidoxypropyltrimethoxy-silane (pts. by wt.) | | | | | | | 2 |
|   | γ-aminopropyltriethoxy-silane (pts. by wt.) | | | | | 2 | 2 | 1 |
|   | γ-mercaptopropyltrimethoxy-silane (pts. by wt.) | | | | | | | |
| E | glass fiber (pts. by wt.) | 73 | 73 | 73 | 73 | 73 | 73 | 73 |
| Izod impact strength | notched [kg cm/cm] | 13.5 | 10.2 | 14.2 | 17.6 | 17.3 | 16.3 | 16.8 |
|   | unnotched [kg cm/cm] | 53.1 | 46.5 | 55.4 | 60.2 | 60.8 | 58.7 | 59.3 |
| Tensile elongation [%] | | 2.0 | 1.7 | 2.1 | 2.4 | 2.4 | 2.3 | 2.3 |
| Tensile strength [kg f/cm²] | | 1640 | 1540 | 1520 | 1540 | 1560 | 1540 | 1540 |

*polyamide elastomer comprising nylon 12 as a hard segment and polyoxybutylene as a soft segment and having a flexural modulus of 900

We claim:

1. A polyarylene sulfide resin composition prepared by mixing 100 parts by weight of a resin component comprising
   (A) 99 to 20 parts by weight of a polyarylene sulfide resin and
   (B) 1 to 80 parts by weight of a polyamide resin with
   (C) 0.5 to 50 parts by weight of an olefin copolymer comprising an α-olefin and a glycidyl ester of an α,β-unsaturated acid,
   (D) 0.01 to 5 parts by weight of an alkoxysilane compound and
   (E) 0 to 400 parts by weight of one or more fillers selected from among fibrous, powdery and flaky ones.

2. A polyarylene sulfide resin composition as set forth in claim 1, wherein the alkoxysilane compound (D) is at least one silane compound selected from the group consisting of vinylalkoxysilane, epoxyalkoxysilane, aminoalkoxysilane and mercaptoalkoxysilane.

3. A polyarylene sulfide resin composition as set forth in claim 1 or 2, wherein the olefin copolymer (C) is one comprising ethylene and a glycidyl ester of an α,β-unsaturated acid as the main components.

4. A polyarylene sulfide resin composition as set forth in claim 1 or 2, wherein the olefin copolymer (C) is a graft copolymer comprising (a) an olefin copolymer mainly comprising an α-olefin and a glycidyl ester of an α,β-unsaturated acid and (b) one or more members selected from among vinyl polymers and copolymers each constituted of repeating units represented by the following general formula (1) which are chemically bonded to the copolymer (a) to form a branched or crosslinked structure:

wherein R represents a hydrogen atom or a lower alkyl group; X represents one or more groups selected from among —COOCH$_3$, —COOC$_2$H$_5$, COOC$_4$H$_9$, —COOCH$_2$CH(C$_2$H$_5$)C$_4$H$_9$, —CN and

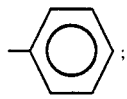

and n is an integer of 1 or above.

5. A polyarylene sulfide resin composition as set forth in claim 1 wherein said polyamide is selected from nylon 6 and nylon 66.

6. A polyarylene sulfide resin composition as set forth in claim 3 wherein said component C is present in amounts of from 1 to 20 parts by weight per 100 parts by weight of A and B.

7. A polyarylene sulfide resin composition as set forth in claim 4 wherein said component C is present in amounts of from 1 to 20 parts by weight per 100 parts by weight of A and B.

8. A polyarylene sulfide resin composition as set forth in claim 1 or 2 wherein said compound D is present in amounts of from 0.1 to 3 parts by weight per 100 parts by weight of A and B.

9. A polyarylene sulfide resin composition as set forth in claim 1 comprising a positive amount of filler E.

10. A polyarylene sulfide resin composition according to claim 9 wherein said filler comprises glass fiber.

11. A polyarylene sulfide resin composition as set forth in claim 1 wherein said polyarylene sulfide resin A is polyphenylene sulfide.

12. A polyarylene sulfide resin composition as set forth in claim 11 wherein said polyarylene sulfide is a copolymer of p-phenylene sulfide units and m-phenylene sulfide units.

13. A polyarylene sulfide resin composition as set forth in claim 11 wherein said polyarylene sulfide is a homopolymer of p-phenylene sulfide units.

14. A polyarylene sulfide resin composition as set forth in claim 1 wherein said polyamide resin B includes a polyamide elastomer, said polyamide elastomer comprising a block copolymer containing hard polyamide segments selected from the group consisting of nylon 6; nylon 66; nylon 6,12; nylon 6,11 and nylon 12 and soft segment selected from the group consisting of polyoxyethylene glycol, polyoxypropylene glycol and polyoxytetramethylene glycol.

15. A polyarylene sulfide resin composition as set forth in claim 14 wherein said polyamide resin B comprises a mixture of nylon 6 or nylon 66 with said polyamide elastomer.

* * * * *